US012067449B2

(12) United States Patent
He

(10) Patent No.: US 12,067,449 B2
(45) Date of Patent: Aug. 20, 2024

(54) 4D BARCODE MAPPING FOR MOVING OBJECTS

(71) Applicant: ZEBRA TECHNOLOGIES CORPORATION, Lincolnshire, IL (US)

(72) Inventor: Duanfeng He, South Setauket, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/900,789

(22) Filed: Aug. 31, 2022

(65) Prior Publication Data

US 2024/0070413 A1    Feb. 29, 2024

(51) Int. Cl.
*G06K 7/10*     (2006.01)
*G06K 7/14*     (2006.01)
*G06T 7/20*     (2017.01)
*G06T 7/70*     (2017.01)

(52) U.S. Cl.
CPC ....... *G06K 7/10722* (2013.01); *G06K 7/1417* (2013.01); *G06T 7/20* (2013.01); *G06T 7/70* (2017.01); *G06T 2200/04* (2013.01); *G06T 2207/30204* (2013.01)

(58) Field of Classification Search
CPC ........... G06K 7/10722; G06K 7/10732; G06K 7/10693; G06K 7/1417; G06K 7/10861; G06K 7/10663; G06T 19/00; G06T 7/70; G06T 7/50; G06T 7/20; G06T 2200/04; G06T 2207/10028; G06T 2207/30204; G06T 2215/06; G06T 2200/08; G06T 7/62
See application file for complete search history.

(56) References Cited

U.S. PATENT DOCUMENTS

| 2010/0079481 | A1 |   4/2010 | Zhang et al. |
| 2015/0193761 | A1* | 7/2015 | Svetal .................. G06Q 20/208 |
| | | | 705/23 |
| 2017/0030766 | A1* | 2/2017 | Hendrick ........... G06Q 30/0207 |

(Continued)

FOREIGN PATENT DOCUMENTS

| CA | 2395647 A1 * | 7/2001 | |
| CN | 109127445 A * | 1/2019 | .............. B07C 3/14 |
| JP | 2016117121 A * | 6/2016 | |

OTHER PUBLICATIONS

Simske et al "Incremental Information Objects and Progressive Barcodes" (Year: 2012).*

(Continued)

*Primary Examiner* — Thien T Mai
(74) *Attorney, Agent, or Firm* — Yuri Astvatsaturov

(57) ABSTRACT

Systems and methods for tracking objects in space are disclosed. The systems and methods include capturing two-dimensional (2D) image data from which a barcode is decoded and capturing, generating, or otherwise accessing three-dimensional (3D) image data from which a 3D object is identified. A 2D image of a barcode and barcode data is combined with the 3D object to form reference 3D object data that is used for comparison to subsequently captured 3D and 2D image data. In some examples, a four-dimensional (4D) projection of the reference 3D object data is used for comparison and validation of the subsequently captured 3D and 2D image data.

24 Claims, 13 Drawing Sheets

(56) References Cited

U.S. PATENT DOCUMENTS

2018/0333749 A1 11/2018 Wagner et al.
2020/0047218 A1 2/2020 Cherry et al.

OTHER PUBLICATIONS

Xu et al "Vehicle autonomous localization in local area of coal mine tunnel based on vision sensors and ultrasonic sensors" (Year: 2017).*
International Search Report and Written Opinion for International Application No. PCT/US2023/28641 mailed on Oct. 10, 2023.

* cited by examiner

4D BARCODE MAPPING FOR MOVING OBJECTS

BACKGROUND

Machine vision systems generally provide high fidelity image analysis, making them attractive for imaging and analyzing moving objects. Machine vision cameras, for example, are commonly deployed in industrial applications to track objects moving through a facility on a conveyor belt or similar transportation system. In some such applications, multiple machine vision cameras are used to image and scan objects over a scan region and also scanning barcodes of that scan region, with the hopes of associating the objects with their respective barcodes. While is it important to properly account for objects by tracking their respective barcodes, tracking errors occur. In some instances, an object moves on the conveyor belt across an entire scan region and is never identified by barcode. The object could be obscured by another object, confused to be part of another object, or the like. In some instances, the object may be identified by one machine vision camera, but fail to be identified by a subsequent machine vision camera positioned at a downstream location of the conveyor belt. In yet other instances, an object may be identified by multiple machine vision cameras that collectively fail to recognize that it is the same object just at a different conveyor belt location, resulting in duplicative identification of the same object.

Thus, there is a need for systems and methods for more accurately tracking moving objects using machine vision systems.

SUMMARY

In an embodiment, the present invention is a system for tracking barcodes in space. The system comprises: a three-dimensional (3D) data acquisition subsystem; a two-dimensional (2D) imaging subsystem comprising one or more 2D imagers and one or more decode processors, wherein the 2D imaging subsystem is oriented and configured to: at the one or more 2D imagers, capture a 2D image data representing a 2D image of an environment of a scan tunnel; and at the one or more decode processors, decode a barcode identified in the captured 2D image data; a computing subsystem including one or more processors, and a non-transitory computer-readable storage medium storing instructions that, when executed by the one or more processors, cause the computing system to: access, from the 3D data acquisition subsystem, captured 3D image data corresponding to a 3D representation of the environment; and identify in the environment an object, based on the captured 3D image data, and associate the object with the barcode identified in the captured 2D image data to generate marked object data representing the object in the environment.

In a variation of this embodiment, the non-transitory computer-readable storage medium stores instructions that, when executed by the one or more processors, cause the computing system to: access, from the 3D data acquisition subsystem, subsequent captured 3D image data corresponding to a subsequent 3D representation of a subsequent environment of the scan tunnel downstream of the environment; identify in the subsequent environment an object from the subsequent captured 3D image data; in response to successfully associating a decoded barcode corresponding to the subsequent environment with the object in the subsequent environment, generating a successful scan indication; and in response to not successfully associating a decoded barcode with the object in the subsequent environment, generating a failed scan indication.

In a variation of this embodiment, the non-transitory computer-readable storage medium stores instructions that, when executed by the one or more processors, cause the computing system to: at the one or more 2D imagers, capture a subsequent 2D image data representing a 2D image of a subsequent environment; and at the one or more decode processors, attempt to identify a barcode in the subsequent 2D image data and, in response, decode the identified barcode identified in the subsequent 2D image data.

In a variation of this embodiment, the non-transitory computer-readable storage medium stores instructions that, when executed by the one or more processors, cause the computing system to: generate the failed scan indication in response to, at the one or more 2D imagers, unsuccessfully capturing a subsequent 2D image data representing a 2D image of the subsequent environment, or at the one or more 2D imagers, capturing the subsequent 2D image data representing a 2D image of the subsequent environment and unsuccessfully identifying a barcode in the subsequent 2D image data.

In a variation of this embodiment, the non-transitory computer-readable storage medium stores instructions that, when executed by the one or more processors, cause the computing system to: perform a four-dimensional (4D) projection of the marked object data in the scan tunnel, the projection representing an expected future location of the object in the scan tunnel based on an expected or measured movement of the object.

In a variation of this embodiment, the system further comprises: at the one or more 2D imagers, capture a subsequent 2D image data representing a 2D image of a subsequent environment of the scan tunnel downstream of the environment; at the one or more decode processors, decode a subsequent barcode identified in the subsequent 2D image data; and wherein the instructions, when executed by the one or more processors, cause the computing system to: access, from the 3D data acquisition subsystem, subsequent captured 3D image data corresponding to a subsequent 3D representation of the subsequent environment; identify in the subsequent environment a subsequent object from the subsequent captured 3D image data; associate the subsequent object with the subsequent barcode to generate subsequent marked object data representing the subsequent object; determine whether the subsequent marked object data satisfies the 4D projection of the marked object data space; and when the subsequent marked object data satisfies the 4D projection of the marked object data, determine that the decoding of the subsequent barcode is a duplicate decoding of the barcode.

In a variation of this embodiment, the instructions, when executed by the one or more processors, cause the computing subsystem to determine whether the subsequent marked object data satisfies the 4D projection of the marked object data space by: determining whether the subsequent marked object data at least partially overlaps with the 4D projection of the marked object data space in the subsequent environment; and if the subsequent marked object data at least partially overlaps with the 4D projection of the marked object data space in the subsequent environment, determining that the subsequent marked object data satisfies the 4D projection of the marked object data space.

In a variation of this embodiment, the instructions, when executed by the one or more processors, cause the computing subsystem to determine whether the subsequent marked object data satisfies the 4D projection of the marked object data space by: if the subsequent marked object data does not at least partially overlap with the 4D projection of the marked object data space in the subsequent environment, determining that the subsequent marked object data does not satisfy the 4D projection of the marked object data space and determining that the subsequent object is different than the object.

In a variation of this embodiment, the system further comprises a moving surface configured to move across the scan tunnel, and wherein the instructions, when executed by the one or more processors, cause the computing subsystem to perform the 4D projection of the marked object data in the scan tunnel, based on the expected movement of the moving surface upon which the object is to reside.

In a variation of this embodiment, the moving surface is a conveyor belt moving substantially linearly through the environment.

In a variation of this embodiment, the instructions, when executed by the one or more processors, cause the computing subsystem to associate the object with the barcode by identifying the location and the orientation of the barcode relative to the object based on a position and an orientation of the one or more 2D imagers In a variation of this embodiment, the instructions, when executed by the one or more processors, cause the computing subsystem to associate the object with the barcode by accessing the captured 3D image data captured at a capture time associated with a captured time of the 2D image data.

In a variation of this embodiment, the 3D data acquisition subsystem comprises a 3D camera, a time-of-flight 3D camera, a structured light 3D camera, or a machine learning model that processes one or more 2D images to create the 3D image data.

In a variation of this embodiment, the computing subsystem is communicatively coupled to the one or more barcode scanner subsystems and/or to the 3D data acquisition subsystem through a communication network.

In another embodiment, the present invention is a method for tracking barcodes in space. The method comprises: capturing, at the one or more two-dimensional (2D) imagers, 2D image data representing a 2D image of an environment of a scan tunnel; decoding, at one or more decode processors, a barcode identified in the captured 2D image data; accessing, from a three-dimensional (3D) data acquisition subsystem, captured 3D image data corresponding to a 3D representation of the environment; and identifying in the environment an object, based on the captured 3D image data, and associating the object with the barcode identified in the captured 2D image data to generate a marked object data representing the object in the environment.

In a variation of this embodiment, the method further comprises: accessing, from the 3D data acquisition subsystem, subsequent captured 3D image data corresponding to a subsequent 3D representation of the a subsequent environment of the scan tunnel downstream of the first environment; identifying in the subsequent environment an object from the subsequent captured 3D image data; in response to successfully associating a subsequently decoded barcode corresponding to the subsequent environment with the object in the second environment, generating a successful scan indication; and in response to not successfully associating a subsequently decoded barcode with the object in the second subsequent environment, generating a failed scan indication.

In a variation of this embodiment, the method comprises: at the one or more 2D imagers, capturing a subsequent 2D image data representing a 2D image of a subsequent environment; and at the one or more decode processors, attempting to identify a barcode in the subsequent 2D image data and, in response, decoding the identified barcode identified in the subsequent 2D image data.

In a variation of this embodiment, the method comprises generating the failed scan indication in response to, at the one or more 2D imagers, unsuccessfully capturing a subsequent 2D image data representing a 2D image of the subsequent environment, or at the one or more 2D imagers, capturing the subsequent 2D image data representing the 2D image of the subsequent environment and unsuccessfully identifying a barcode in the subsequent 2D image data.

In a variation of this embodiment, the method comprises: performing a four-dimensional (4D) projection of the marked object data in the scan tunnel, the projection representing an expected future location of the object in the scan tunnel based on an expected or measured movement of the object.

In a variation of this embodiment, the method comprises: at the one or more 2D imagers, capturing a subsequent 2D image data representing a 2D image of a subsequent environment of the scan tunnel downstream of the environment; at the one or more decode processors, decoding a subsequent barcode identified in the subsequent 2D image data; and accessing, from the 3D data acquisition subsystem, subsequent captured 3D image data corresponding to a subsequent 3D representation of the subsequent environment; identifying in the subsequent environment a subsequent object from the subsequent captured 3D image data; associating the subsequent object with the subsequent barcode to generate subsequent marked object data representing the subsequent object; determining whether the subsequent marked object data satisfies the 4D projection of the marked object data space; and when the subsequent marked object data satisfies the 4D projection of the marked object data, determining that the decoding of the subsequent barcode is a duplicate decoding of the barcode.

In a variation of this embodiment, the method comprises: determining whether the subsequent marked object data at least partially overlaps with the 4D projection of the marked object data space in the subsequent environment; and if the subsequent marked object data at least partially overlaps with the 4D projection of the marked object data space in the subsequent environment, determining that the subsequent marked object data satisfies the 4D projection of the marked object data space.

In a variation of this embodiment, the method comprises: if the subsequent marked object data does not at least partially overlap with the 4D projection of the marked object data space in the subsequent environment, determining that the subsequent marked object data does not satisfy the 4D projection of the marked object data space and determining that the subsequent object is different than the object.

In a variation of this embodiment, the method comprises: performing the 4D projection of the marked object data in the scan tunnel, based on the expected movement of a moving surface upon which the object is to reside.

In a variation of this embodiment, the method comprises: associating the object with the barcode by identifying the location and the orientation of the barcode relative to the object based on a position and an orientation of the one or more 2D imagers.

In a variation of this embodiment, the method comprises: associating the object with the barcode by accessing the captured 3D image data captured at a capture time associated with a captured time of the 2D image data.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
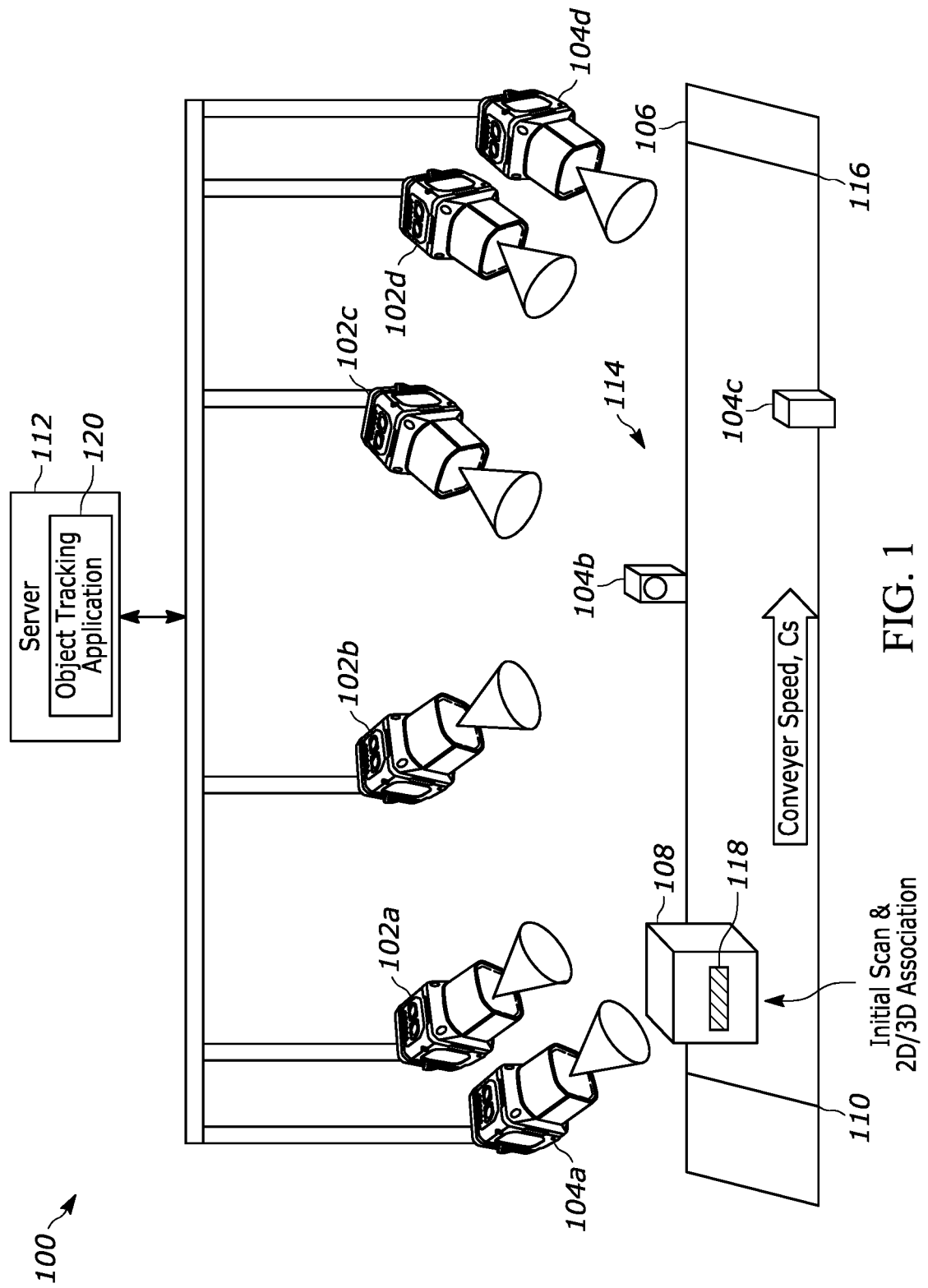
FIG. 1 depicts an example environment in which systems/devices for tracking a barcode may be implemented and showing an associated 3D object with 2D barcode data, in accordance with embodiments described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

As previously mentioned, machine vision systems can be susceptible to errors while tracking moving objects, in particular fast moving objects transported within a facility on a conveyor belt or other transportation mechanism. In particular, machine vision systems may track an object but fail to track the barcodes associated with that object. For example, in some instances, an object moves on the conveyor belt across an entire scan region and is never associated with a barcode and thus is never identified. The object could be obscured by another object, confused to be part of another object, or the like. In some instances, the object may be identified by barcode by one machine vision camera, but fail to be identified by a subsequent machine vision camera positioned at a downstream location of the conveyor belt. In yet other instances, an object may be identified by barcode by multiple machine vision cameras that collectively fail to recognize that it is the same object just at different conveyor belt locations and at different moments of time, resulting in duplicative identification of the same object.

Thus, it is an objective of the present disclosure to provide systems and methods capable of determining at the end of the scan region whether an object has been associated with one or more barcodes from 2D images, and if the object was associated with more than one barcode from a 2D image, any duplicate associations are removed, and if the object was not, the object is virtually marked so that follow up actions can be taken. More specifically, in some examples, it is an objective of the present disclosure to eliminate these and other problems with conventional machine vision systems by performing four dimensional (4D) tracking of moving objects by use of two-dimensional (2D) barcode mapping and three-dimensional (3D) image data. Various machine vision cameras are positioned at different locations along a conveyor system, each capturing image data of a different portion of the conveyor system and possibly at different orientations. Captured 2D image data may be used to identify from 2D image data a barcode or other indicia associated with the object, and captured or generated 3D image data be used to identify the location of the object in a 3D space. As used herein, references to associating a barcode or other indicia with an object refers to associating an image of a barcode or other indicia obtained from 2D image data, where in some examples, such associations include associating not only the image of the barcode or other indicia, but also associating the decoded barcode (payload) data or decoded indicia data obtained from the same. Geometric projections, in both 3D space and time, may then be made using various data types, for example, calibration data, location data, and orientation data on the various machine vision cameras. Geometric projections of initial 2D and/or 3D image data are then used to identity duplicate decode detection events, where a barcode associated with the same object has been erroneously scanned and decode multiple times. Further, the lack of sufficient geometric projections may be used to identify missed scan events, where an object was not scanned even though it passed through a conveyor belt scan tunnel or where an object was tracked only over part of the conveyor belt scan tunnel and not over the entire zone.

FIG. 1 depicts an example environment 100 in which systems/devices for tracking objects in space using imaging devices, in accordance with embodiments described herein. The example environment 100 may generally be an industrial setting that includes different sets of imaging devices 102/104 positioned over or around a conveyor belt 106. The imaging devices 102 may be machine vision cameras each positioned at a different location along the conveyor belt 106 and each having a different orientation relative to the conveyor belt 106, where the machine vision cameras 102 are configured to capture image data over a corresponding field of view. The imaging devices 102 may be 3D image devices, such as 3D cameras that capture a 3D image data of an environment. Collectively, the 3D imaging devices 102 may form a three-dimensional (3D) data acquisition subsystem of the environment 100. Example, 3D imaging devices herein include time-of-flight 3D cameras where the 3D image data captured is a map of distances of objects to the camera, structure light 3D cameras where one device projects a typically non-visible pattern on objects and an offset camera captures the pattern where each point in the pattern is shifted by an amount indicative of the objects upon which the point falls, or a virtual 3D camera where, for example, 2D image data is captured and passed through a trained neural network or other image processor to generate a 3D scene from the 2D image data.

The imaging devices 104 may be 2D imagers, such as 2D color imagers or 2D grayscale imagers, each configured to capture 2D image data of a corresponding field of view. Generally, the imaging devices 104 are 2D imagers configured to identify barcodes in 2D image data and decode the identified barcodes. Examples of such barcodes include 1D barcodes, 2D barcodes such as quick response (QR) codes, or other indicia identifiable within 2D image data. Therefore, in some examples, collectively, the imaging devices 104 may form a barcode scanner subsystem of the environment 100. The belt 106 may carry a target object 108 across an entry point 110 where a set of initial imaging devices 102 and 104 are located. The captured images from the imaging devices may be transmitted to a server 112 for analysis, where the server 112 may facilitate tracking objects in space as objects move along the conveyor belt 106. The server 112 may be communicatively coupled to each of the imaging devices 102 and 104, so that the target object 108 may travel along the conveyor belt 106 past each of the set of imaging devices 102 and 104 and the images captured from each of the imaging devices 102 and 104 may be used, by the server 112, to track and mark the objects at one or more different locations as the object 108 travels along the conveyor belt 106. The combination of the conveyor belt 106 and the set of machine vision cameras 104 and barcode images 102 may be referenced herein as a "scan tunnel" or "scan tunnel".

More specifically, the set of imaging devices 102 and 104 may be organized in an array or other manner that allows capturing images along the entire working length of a and may be arranged in a leader/follower configuration with a leader device (not shown), that may be configured to trigger the machine vision cameras 104 to capture 3D image data of the target object 108, organize results from each machine vision camera's image capture/inspection, and transmit the results and/or the captured images to the server 112. Each imager of the imaging devices 102 and 104 stores a program for execution (e.g., a "job") that includes information regarding the respective imagers image-capture parameters, such as focus, exposure, gain, specifics on the type of symbology targeted for decoding, or specific machine vision inspection steps.

In operation, the object 108 on the conveyor belt 106 enters a scan tunnel 114 at the entry point 110 and exists at an exit point 116, traveling on the conveyor belt 106 at conveyor speed, Cs. The object 108 is initially imaged by the machine vision camera 102a and the 2D imaging device 104a, both positioned to capture separate images of a first environment of the scan tunnel 114, coinciding with the entry point 110. In particular, the machine vision camera 102a captures 3D image data corresponding to a 3D representation of the environment around the entry point 110. The imaging devices 104 captures 2D image data representing a 2D image of that environment. The imaging device 104a, having a 2D imager, is configured to capture 2D images and identify a barcode present in those images, decode the barcode, and send the 2D image and decoded barcode data to the server 112. In the illustrated example, the object 108 contains a barcode 118 that is identified in captured 2D image data from the imaging device 104a, decoded, and that data is sent to the server 112. It should be appreciated that, while one machine vision camera 102a and one 2D imaging device 104a are shown, any suitable number of devices may be used in order to capture all images of the target object 108s, take multiple image captures of the target object 108, and/or otherwise capture sufficient image data of the target object 108 to enable the server 112 to accurately track and identify the target object 108.

At the server 112, and as further detailed below, the server 112 executes an object tracking application 120 that analyzes the received 3D image data from the machine vision camera 102a and the 2D image data, including barcode data, from the imaging device 104a and performs an association between the two image data types and generates marked object data that is stored at the server 112. The marked object data thereby represents the 3D object data with the 2D image of the barcode projected onto the 3D object space, for example, projected on a 3D point cloud of the 3D object data. In some examples, the 2D image of the barcode is projected onto the 3D object space. In other examples, the 2D image of the barcode is projected and additionally the barcode data (payload) is associated with the 3D object data, for example, as metadata. The server 112 having generated the marked object data uses that marked object data to track the object 108 as it moves on the conveyor belt 106 to the exit point 116.

To facilitate the tracking, in various examples, the server 112 takes a timestamp of the 2D image that resulted in a decoded barcode, and the location of the 2D imaging device 104a-d that took that 2D image. Further the server 112 accesses a sequence of 3D images it has in its memory (e.g., as captured by one or more of the machine vision cameras 102a-d) and the timestamps corresponding to the 3D images. The server 112 is then able to perform an association between the barcode time and the 3D images, based on known or measured speed of the conveyor belt 106, and the location of the machine vision cameras 102a-102d, to derive a 3D scene that corresponds to the viewpoint and timestamp of the 2D image which resulted in the decode. The server 112, through the object tracking application 120, further receives the location of the decoded barcode in the 2D image, and, through the known viewpoint of the imager in the 3D space, projects this location onto an object in the 3D scene previously derived, onto an object in the 3D scene. The server 112 then virtually marks the object as bearing a barcode the content of which has been received from the scanner, thus generating a marked object data in virtual space. That marked object data may then be used to examine downstream captured 3D images of objects and 2D images of barcodes, for further object tracking across a scan tunnel through which the conveyor belt 106 passes.

Figure 2:
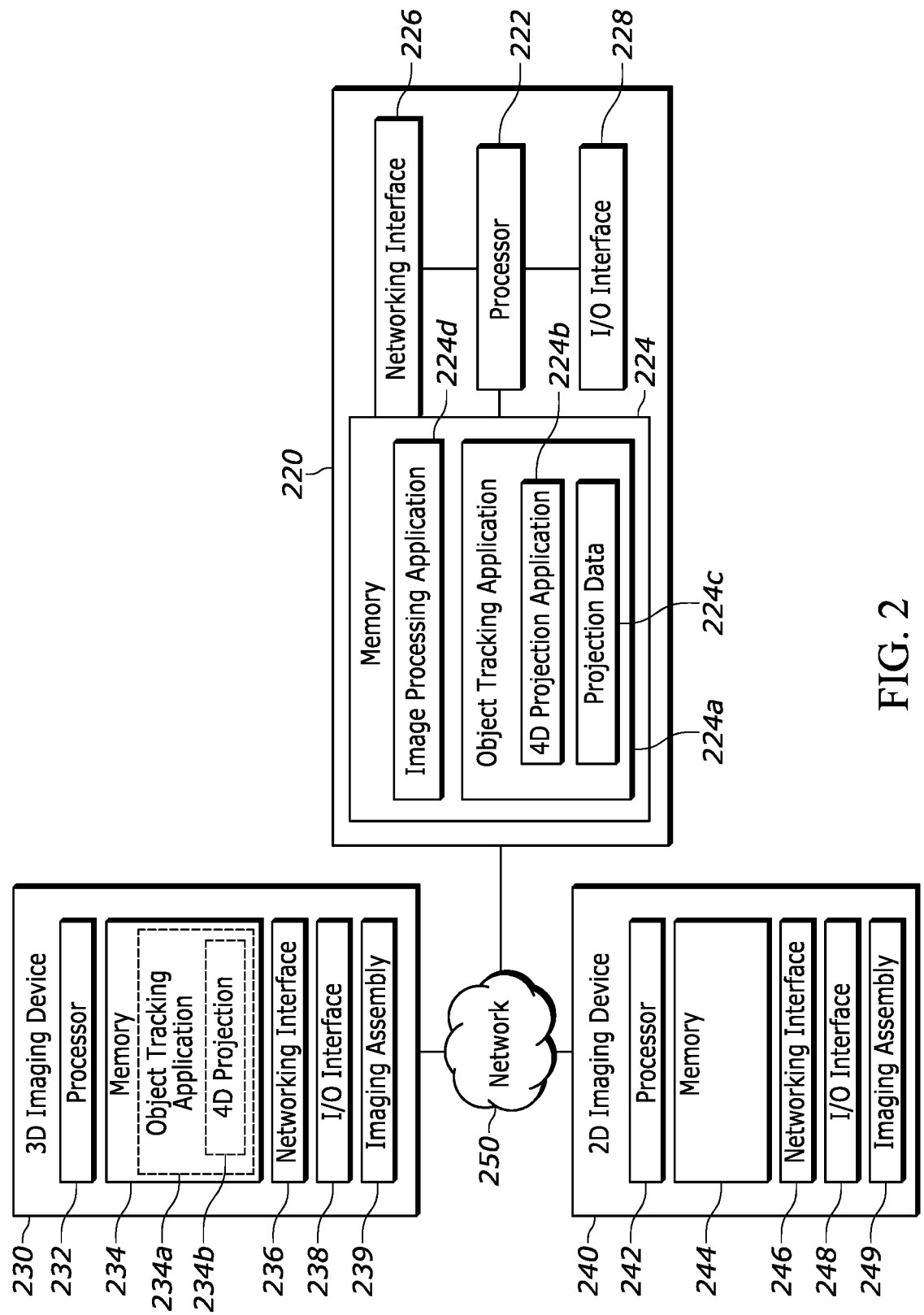
FIG. 2 is a block diagram of an example logic circuit for implementing example methods and/or operations described herein.

FIG. 2 is a block diagram representative of an example logic circuit capable of implementing example methods and/or operations described herein. As an example, the example logic circuit may be capable of implementing one or more components of FIGS. 1, 2, 4A, 4B, and 7-9. The example logic circuit of FIG. 2 is a processing platform 220 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs). In an example, the processing platform 220 is implemented at the server 112 in FIG. 1.

The example processing platform 220 of FIG. 2 includes a processor 222 such as, for example, one or more microprocessors, controllers, and/or any suitable type of processor. The example processing platform 220 of FIG. 2 includes memory (e.g., volatile memory, non-volatile memory) 224 accessible by the processor 222 (e.g., via a memory controller). The example processor 222 interacts with the memory 224 to obtain, for example, machine-readable instructions stored in the memory 224 corresponding to, for example, the operations represented by the flowcharts of this disclosure. The memory 224 includes an object tracking application 224a having a 4D projection application 224b and projection data 224c imaging programs 224b that are each accessible by the example processor 222. The object tracking application 224a including the 4D projection application 224b may comprise rule-based instructions, an artificial intelligence (AI) and/or machine learning-based model, and/or any other suitable algorithm architecture or combination thereof configured to, for example, perform object tracking and 4D projections of object data. To illustrate, the example processor 222 may access the memory 224 to execute the object tracking application 224a and the 4D projection application 224b when a 3D imaging device 230 and/or a 2D imaging device 240 (via the imaging assemblies 239, 249) captures a set of image data and communicates that to the processing platform 220. Additionally, or alternatively, machine-readable instructions corresponding to the example operations described herein may be stored on one or more removable media (e.g., a compact disc, a digital versatile disc, removable flash memory, etc.) that may be coupled to the processing platform 220 to provide access to the machine-readable instructions stored thereon.

The example processing platform 220 of FIG. 2B also includes a networking interface 226 to enable communication with other machines via, for example, one or more networks. The example networking interface 226 includes any suitable type of communication interface(s) (e.g., wired and/or wireless interfaces) configured to operate in accordance with any suitable protocol(s) (e.g., Ethernet for wired communications and/or IEEE 802.11 for wireless communications).

The example processing platform 220 of FIG. 2B also includes input/output (I/O) interfaces 228 to enable receipt of user input and communication of output data to the user. Such user input and communication may include, for example, any number of keyboards, mice, USB drives, optical drives, screens, touchscreens, etc.

The example processing platform 220 is connected to a 3D imaging device 230 configured to capture 3D image data of target objects (e.g., target object 108) and 2D imaging device 240 configured to capture 2D image data of target objects (e.g., target object 108) in particular 2D image data of barcodes on target objects. The imaging devices 230 and 240 may be communicatively coupled to the platform 220 through a network 250.

The 3D imaging device 230 may be or include machine vision cameras 102a-d, and may further include one or more processors 232, one or more memories 234, a networking interface 236, an I/O interface 238, and an imaging assembly 239. The 3D imaging device 230 may optionally include an object tracking application 234a and a 4D projection application 224b.

The 2D imaging device 240 may be or include imaging devices 104a-d, and may further include one or more processors 242, one or more memories 244, a networking interface 246, an I/O interface 248, and an imaging assembly 249. The 2D imaging device 240 may also optionally include an object tracking application 234a and a 4D projection application 224b.

Each of the imaging devices 230, 240 may include flash memory used for determining, storing, or otherwise processing imaging data/datasets and/or post-imaging data. The imaging device 230, 240 may then receive, recognize, and/or otherwise interpret a trigger that causes them to capture an image of a target object (e.g., target object 108) in accordance with the configuration established via one or more job scripts. Once captured and/or analyzed, the imaging device 230, 240 may transmit the images and any associated data across the network 250 to the processing platform 220 for further analysis and/or storage in accordance with the methods herein. In various embodiments, the imaging device 230, 240 are "thin" camera devices that capture respective 3D and 2D image data and offload them to the processing platform 220 for processing, without further processing at the imaging device. In various other embodiments, the imaging devices 230, 240 may be "smart" cameras and/or may otherwise be configured to automatically perform sufficient imaging processing functionality to implement all or portions of the methods described herein.

The imaging assemblies 239, 249 may include a digital camera and/or digital video camera for capturing or taking digital images and/or frames. Each digital image may comprise pixel data that may be analyzed in accordance with instructions, as executed by the one or more processors 232, 234, as described herein. The digital camera and/or digital video camera of, for example, the imaging assembly 239 may be configured to take, capture, or otherwise generate 3D digital images and, at least in some embodiments, may store such images in the one or more memories 234. In some examples, the imaging assembly 239 captures a series of 2D images that are processed to generate 3D images, where such processing may occur at the 3D imaging device 230 using an imaging processing application (not shown) or at the processing platform 220 in a processing application 224d. The imaging assembly 249 is configured to take, capture, or otherwise generate 2D digital images that may be stored in the one or more memories 244.

The imaging assembly 240 may include a photo-realistic camera (not shown) or other 2D imager for capturing, sensing, or scanning 2D image data. The photo-realistic camera may be an RGB (red, green, blue) based camera for capturing 2D images having RGB-based pixel data. In various embodiments, the imaging assembly 230 include a 3D camera (not shown) for capturing, sensing, or scanning 3D image data. The 3D camera may include an Infra-Red (IR) projector and a related IR camera for capturing, sensing, or scanning 3D image data/datasets.

Each of the one or more memories 224, 234, and 244 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. In general, a computer program or computer based product, application, or code (e.g., the object tracking application 224a, the 4D projection application 224b, and imaging processing application 224d, and/or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the one or more processors 222, 232, and 242 (e.g., working in connection with the respective operating system in the one or more memories 224, 234, and 244) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

The one or more memories 224, 234, and 244 may store an operating system (OS) (e.g., Microsoft Windows, Linux, Unix, etc.) capable of facilitating the functionalities, apps, methods, or other software as discussed herein. Additionally, or alternatively, the object tracking application 224a, the 4D projection application 224b, and imaging processing application 224d may also be stored in an external database (not shown), which is accessible or otherwise communicatively coupled to the processing platform 220 via the network 130. The one or more memories 224, 234, and 244 may also store machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, otherwise be part of, a machine vision based imaging application, configured to facilitate various functionalities discussed herein. It should be appreciated that one or more other applications may be envisioned and that are executed by the one or more processors 122a, 124a, 126a.

The one or more processors 222, 232, 242 may be connected to the one or more memories 224, 234, 244 via a computer bus responsible for transmitting electronic data, data packets, or otherwise electronic signals to and from the one or more processors 222, 232, 242 and one or more memories 224, 234, 244 in order to implement or perform the machine readable instructions, methods, processes, elements or limitations, as illustrated, depicted, or described for the various flowcharts, illustrations, diagrams, figures, and/or other disclosure herein.

The one or more processors 222, 232, 242 may interface with the one or more memories 224, 234, 244 via the computer bus to execute the operating system (OS). The one or more processors 222, 232, 242 may also interface with the one or more memories 224, 234, 244 via the computer bus to create, read, update, delete, or otherwise access or interact with the data stored in the one or more memories 224, 234, 244 and/or external databases (e.g., a relational database, such as Oracle, DB2, MySQL, or a NoSQL based database, such as MongoDB). The data stored in the one or more memories 224, 234, 244 and/or an external database may include all or part of any of the data or information described herein, including, for example, image data from images captures by the imaging assemblies 239, 249, and/or other suitable information.

The networking interfaces 226, 236, 246 may be configured to communicate (e.g., send and receive) data via one or more external/network port(s) to one or more networks or local terminals, such as network 250, described herein. In some embodiments, networking interfaces 226, 236, 246 may include a client-server platform technology such as ASP.NET, Java J2EE, Ruby on Rails, Node.js, a web service or online API, responsive for receiving and responding to electronic requests. The networking interfaces 226, 236, 246 may implement the client-server platform technology that may interact, via the computer bus, with the one or more memories 224, 234, 244 (including the applications(s), component(s), API(s), data, etc. stored therein) to implement or perform the machine readable instructions, methods, processes, elements or limitations, as illustrated, depicted, or described for the various flowcharts, illustrations, diagrams, figures, and/or other disclosure herein.

According to some embodiments, the networking interfaces 226, 236, 246 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to network 250. In some embodiments, network 250 may comprise a private network or local area network (LAN). Additionally, or alternatively, network 250 may comprise a public network such as the Internet. In some embodiments, the network 250 may comprise routers, wireless switches, or other such wireless connection points communicating to the processing platform 220 (via the networking interface 226), the 3D imaging device 230 (via networking interface 236), and the 2D imaging device 240 (via networking interface 246) via wireless communications based on any one or more of various wireless standards, including by non-limiting example, IEEE 802.11a/b/c/g (WIFI), the BLUETOOTH standard, or the like.

The I/O interfaces 228, 238, 248 may include or implement operator interfaces configured to present information to an administrator or operator and/or receive inputs from the administrator or operator. An operator interface may be provide a display screen (not shown) which a user/operator may use to visualize any images, graphics, text, data, features, pixels, and/or other suitable visualizations or information. For example, the processing platform 220, the 3D imaging device 230, and/or the 2D imaging device 240 may comprise, implement, have access to, render, or otherwise expose, at least in part, a graphical user interface (GUI) for displaying images, graphics, text, data, features, pixels, and/or other suitable visualizations or information on the display screen. The I/O interfaces 228, 238, 248 may also include I/O components (e.g., ports, capacitive or resistive touch sensitive input panels, keys, buttons, lights, LEDs, any number of keyboards, mice, USB drives, optical drives, screens, touchscreens, etc.), which may be directly/indirectly accessible via or attached to the processing platform 220, the 3D imaging device 230, and/or the 2D imaging device 240.

Generally, the object tracking application 224a and image processing application 224d may include and/or otherwise comprise executable instructions (e.g., via the one or more processors 222) that allow a user to configure a machine vision job and/or imaging settings of the imaging devices 230 and 240. For example, the applications 224a and 224d may render a graphical user interface (GUI) on a display (e.g., I/O interface 228) or a connected device, and the user may interact with the GUI to change various settings, modify machine vision jobs, input data, tracking parameters, location data and orientation data for the imaging devices, operating parameters of a conveyor belt, etc.

The object tracking application 224a may be configured address the shortcomings of conventional systems by performing numerous object tracking operations, examples of which are described in reference to FIGS. 3A-5, and 6, and the methods illustrated therein.

Figure 3A:
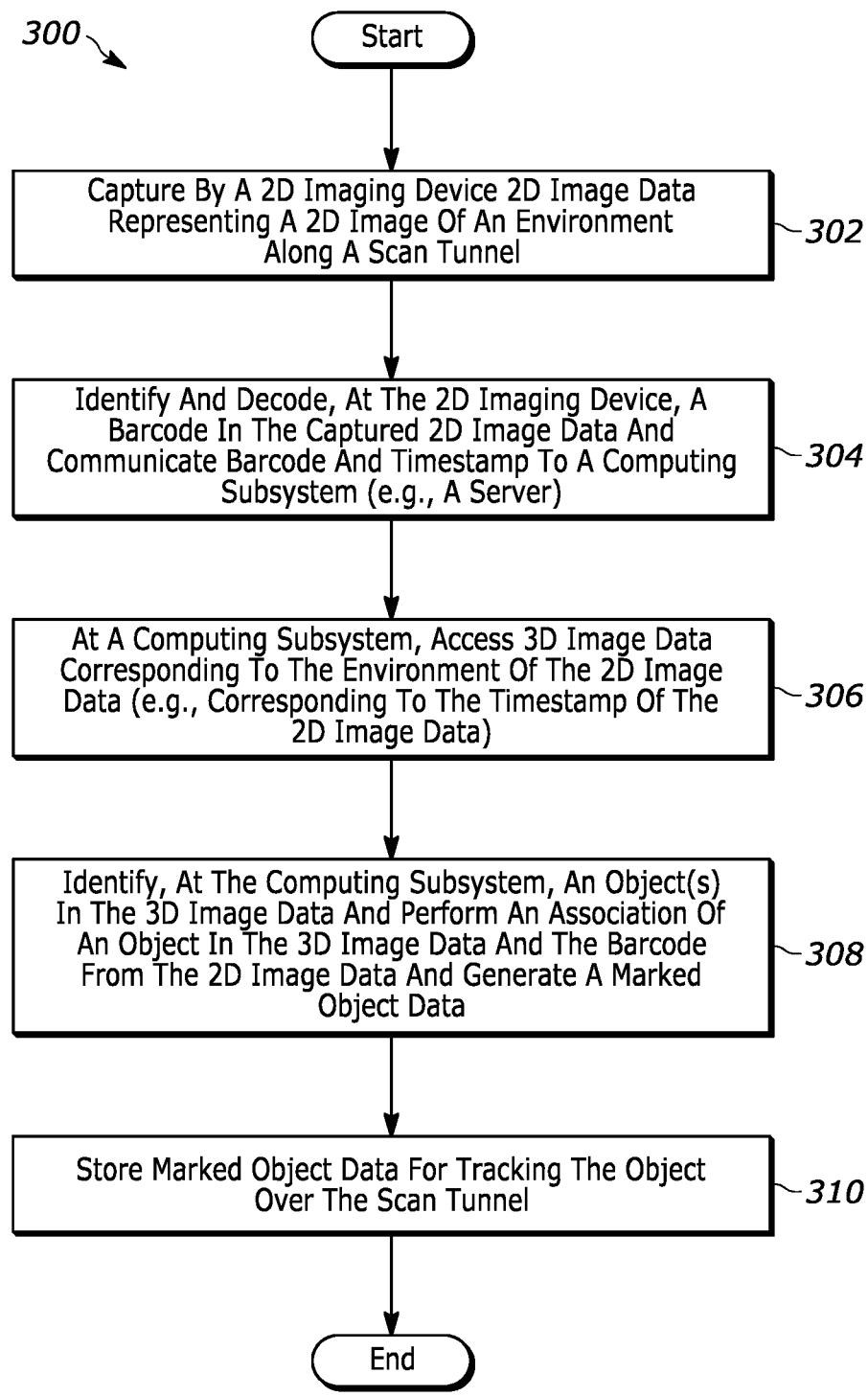
FIG. 3A is a flowchart representative of a method for object identification and barcode marking for use in tracking an object, in accordance with embodiments described herein.

For example, to facilitate object tracking over the scan tunnel 114, the object tracking application 224a, which may be executed by the processing platform 220 serving as a computing subsystem, performs an object identification and marking process as an example of which is shown in method 300 of FIG. 3A. At a block 302, the method 300 captures, by a 2D imaging device such as the 2D imaging device 240 or the imaging devices 104a-104d, 2D image data representing a 2D image of an environment along a scan tunnel. In some examples, the 2D image data is captured separately only received at the block 302. At a block 304, the 2D imaging device identifies and decodes a barcode in the captured 2D image data (such as the barcode 118 of the target object 108) and attaches the timestamp for the moment that image was acquired. The timestamp may be embedded in the 2D image data from the 2D imaging device or determined at the computing subsystem. For the latter, for example, at the block 304, the computing subsystem may determine a timestamp from time data embedded in the 2D image data and, use calibration data (e.g., the locations of the various relevant 2D and 3D imaging devices) to perform a projection on that time data to determine a timestamp that coincides to a time frame of captured 3D image data, e.g., where a 3D imaging device is located downstream or upstream of the 2D imaging device capturing the 2D image data.

At a block 306, the computing subsystem, further accesses 3D image data, where that 3D image data corresponding to the same environment for which the 2D image data was captured. In some examples, at the block 306, the method 300 obtains a timestamp of the 2D image data that resulted in a decoded barcode from block 304, and the location of the 2D imaging device (e.g., 104a-d) that captured that 2D image data. From there, at the block 306, the method 300 may access a sequence of 3D image data from memory (e.g., as captured by one or more of the machine vision cameras 102a-d) and the timestamps corresponding to each captured 3D image data. The 3D image data stored in memory may be a series of continuously captured 3D image data or a video stream of 3D image data, from which the method 300 is to identify a desired 3D image data as one corresponding to the 2D image data. With the timestamp of the 2D image data, the block 306 is then able to identify a desired 3D image data, by comparing that timestamp to the 3D image data timestamp to identify a match, wherein in some examples that comparison is perform by taking into account a known or measured speed of the conveyor belt 106 and the location of the machine vision cameras 102a-102d, to derive a 3D scene (environment) that corresponds to the viewpoint and timestamp of the 2D image which resulted in the decode. That is, the 3D image data of the 3D scene corresponding to the 2D image may have a different (e.g., later) timestamp than that of the 2D image, because the barcode is moving on the conveyor belt 106. In any event, the 3D image data accessed at the block 306 corresponds to the 3D space of the environment within which the 2D image data of the barcode was captured. Furthermore, the 3D image data may be derived from captured 3D image data, in the sense that the 3D image data from two or more sequential times are used to construct an interpolated or extrapolated or predicted 3D image. This is important, for example, if one or more objects have been observed to be moving in relationship to the conveyor belt, such as a box toppling over, or when one box fell over another.

Figure 3B:
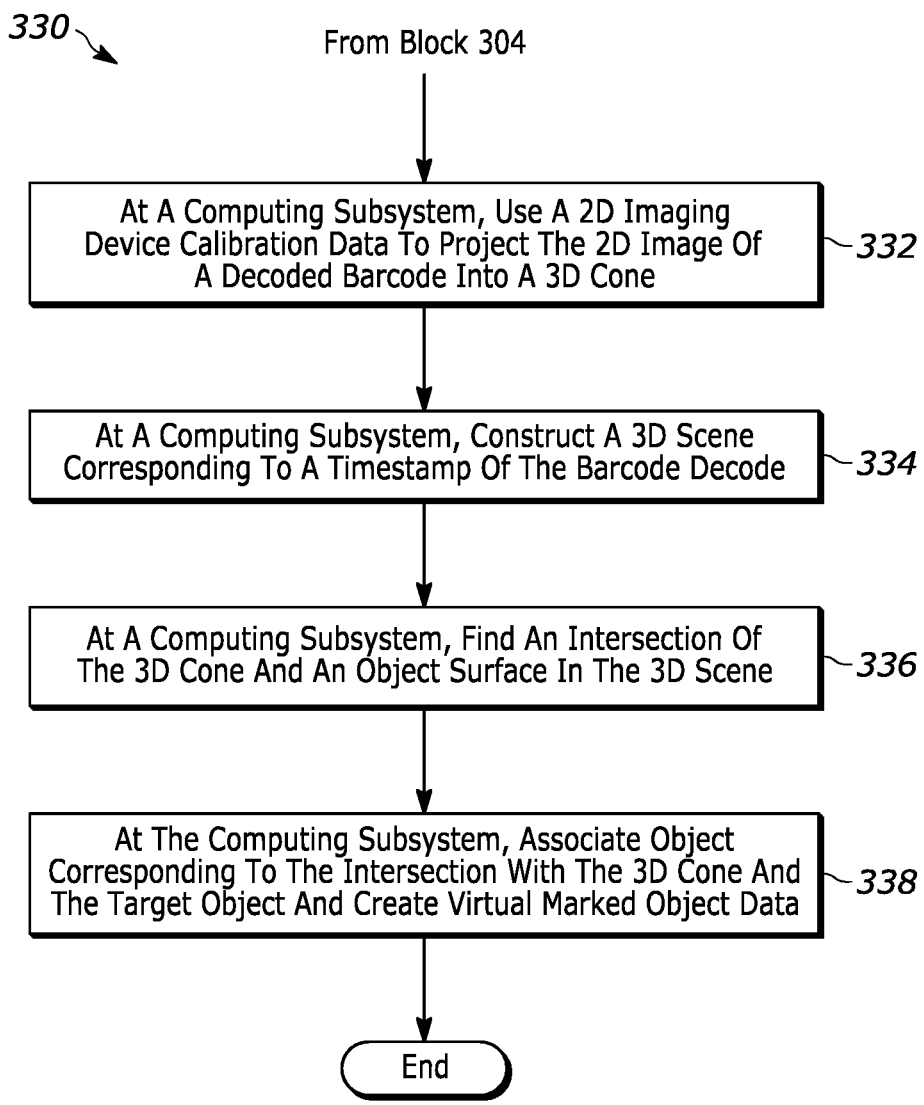
FIG. 3B is flowchart representative of a method for associating a 3D object with a 2D image of a barcode that may be implemented by the method of FIG. 3A, in accordance with embodiments described herein.

At a block 308, the computing subsystem identifies one or more objects, such as the target object 108, in the 3D image data received from the block 306. For example, the block 308 may receive the location of the decoded barcode in the 2D image data, and, through the known viewpoint of the machine vision camera (e.g., 102a-102d) in the 3D space, projects this barcode location onto an object. An example projection is shown in FIG. 3B. The block 308 then virtually marks the object as bearing a barcode (i.e., as bearing a 2D image of the barcode) the content of which has been received from the 2D imaging device, thus generating a marked object data in virtual space. That marked object data is stored at the block 310 for use in examining downstream captured 3D images of objects and 2D images of barcodes, for further object tracking across a scan tunnel through which the conveyor belt 106 passes. That is, at the block 310, the computing subsystem may store the marked object data for use in tracking (e.g., movement, presence, etc.) the object, such as the target object 108, over a scan tunnel, such as the scan tunnel 114. For example, the processing platform 220 may store the marked object data in the memory 224 for access by the tracking application 224a or the 4D projection application 224b.

The processes of block 308 may be implemented in various ways. For example, the method 300 may identify one or more objects in the 3D image data from block 306. From there, the method 300 may perform an association of the object data for the object(s) and the 2D image data from the block 304. For example, at the block 308, the method 300 may identify the particular object in the object data that corresponds to the barcode in the 2D image data and from there generate a virtual marked object data that is stored for use in tracking at the block 312. In some examples, the object data is associated with a 2D image of the barcode, by identifying an intersection or overlap of the 2D image of the barcode and a surface of an object in the object data.

Figure 3C:
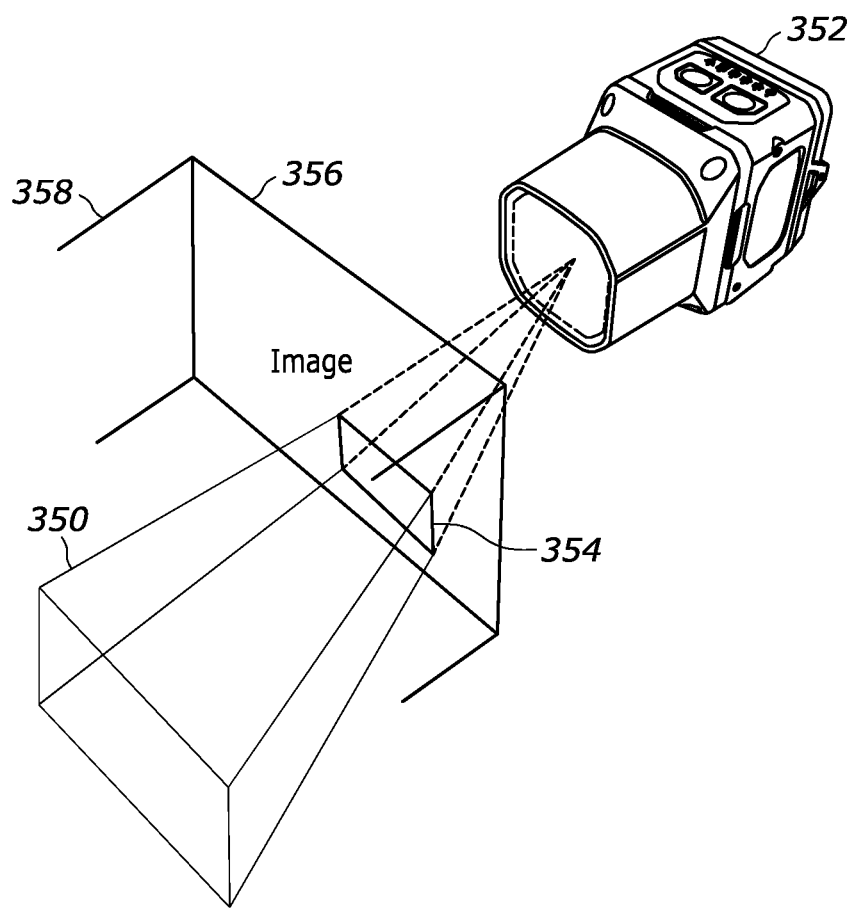
FIG. 3C illustrates a virtual projection of an association of a 3D object with a 2D image of a barcode as may be performed by the method in FIG. 3B, in accordance with embodiments described herein.
Figure 3D:
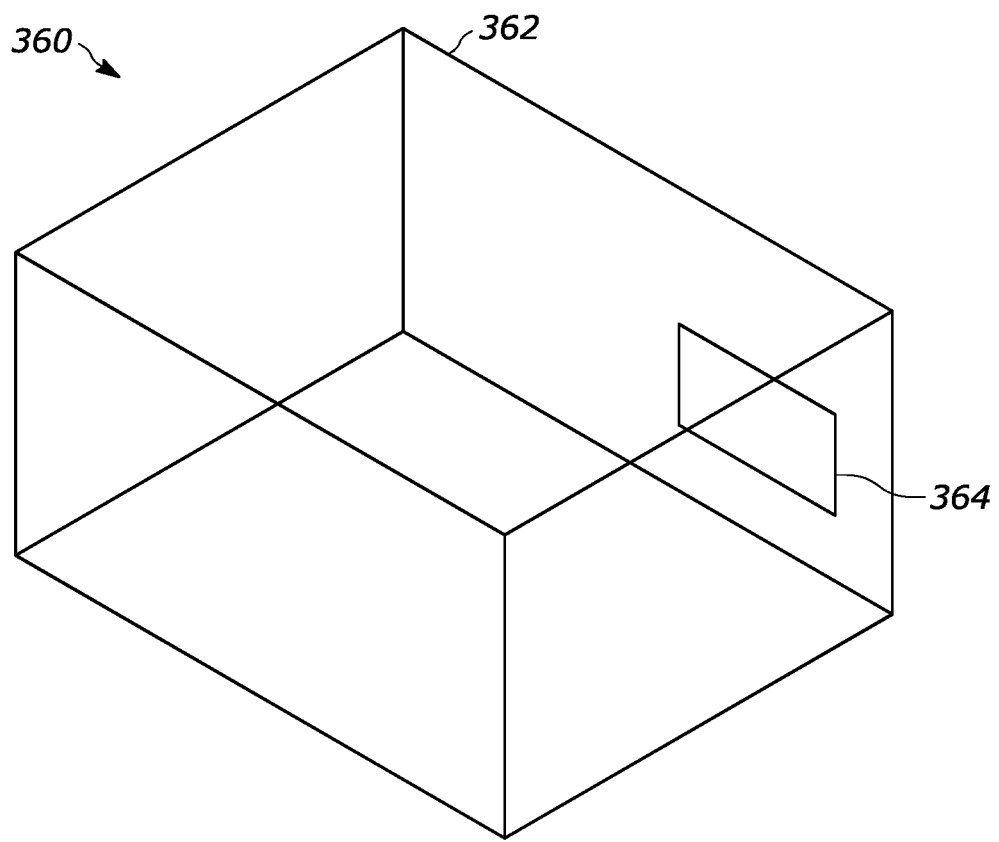
FIG. 3D illustrates a virtually marked object data as may be generated by the method of FIGS. 3A and 3B, in accordance with embodiments described herein.

FIG. 3B illustrates a method 330 that may be implemented by the block 308 to perform object association and marked object data generation. At a block 332, the method 330 (e.g., implemented by a computing subsystem) takes the 2D image data and calibration data for the corresponding 2D imaging device (e.g., location and orientation data of the 2D imaging device) and projects the 2D image of the decoded barcode into a 3D cone. For example, that 2D image may be of 2D image of a 1D barcode, a 2D barcode such as a QR code or other decodable indicia, including decodable text, graphics, symbols, etc. FIG. 3C illustrates an example 3D imaging device 352 that as virtually projected a barcode 2D image 354 into a 3D cone 350. In an example, the block 332 may take a quadrilateral of the barcode from the 2D image data and, using calibration data project that quadrilateral to a 3D cone in 3D space. At a block 334, a 3D scene is constructed corresponding to the timestamp of the decoded barcode, i.e., corresponding to the time at which the 2D image data of the barcode was captured. At a block 336, the 3D cone (e.g., cone 350) is virtually projected into that 3D scene and an intersection of that 3D cone and a surface of an object in the 3D scene is identified (e.g., the intersection of the 3D cone 350 and surface 356 of an object 358 (partially shown). The block 336 may use 3D image data corresponding to the 3D scene and the timestamp of the barcode decode event, as well as calibration data of the corresponding 3D imaging device, to identify the intersection. That is the block 336 (or the block 334) may use calibration data of the 3D imaging device (e.g., location and orientation data of the 3D imaging device, such as relative to that of the 2D imaging device and/or conveyor belt), to find the object surface intersection. At block 338, the method 330 associates the object intersecting with the 3D cone with the decoded barcode of the 2D image data (i.e., the 2D image of the decoded barcode). This way, the block 338 is able to associate only the appropriate object with the barcode, even if the 3D image data corresponding to the 3D scene has multiple objects in it. At a block 338, the method 330 may further create a virtual marked object data defining that association. FIG. 3D illustrates an example virtually-generated marked object data 360 containing a target object 362 and its associated barcode 364.

Figure 4A:
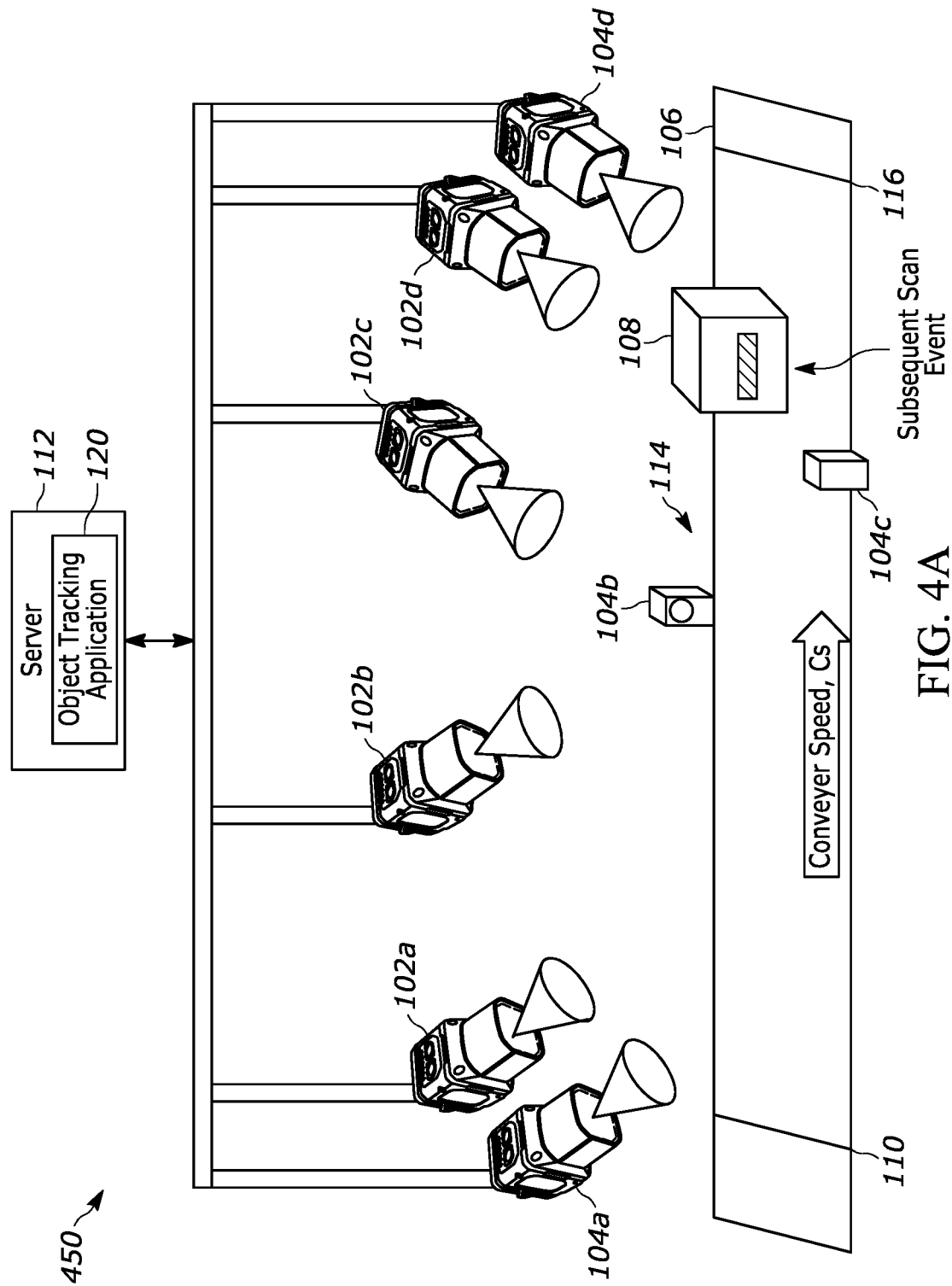
FIGS. 4A and 4B depict an example environment in which systems/devices for tracking a barcode may be implemented and showing a successful subsequent object scan (FIG. 4A) and an unsuccessful subsequent object scan (FIG. 4B), in accordance with embodiments described herein.
Figure 4B:
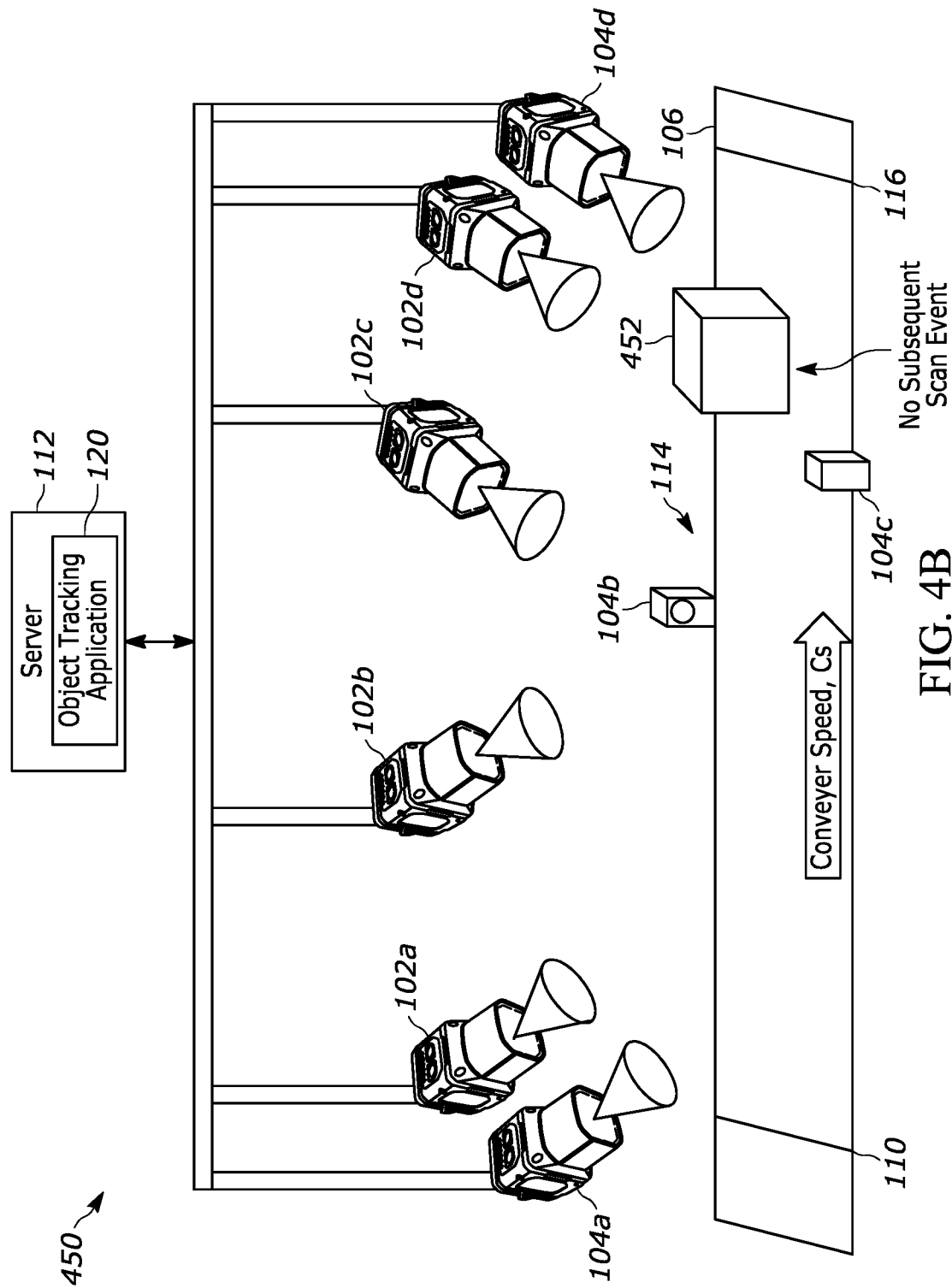
Figure 5:
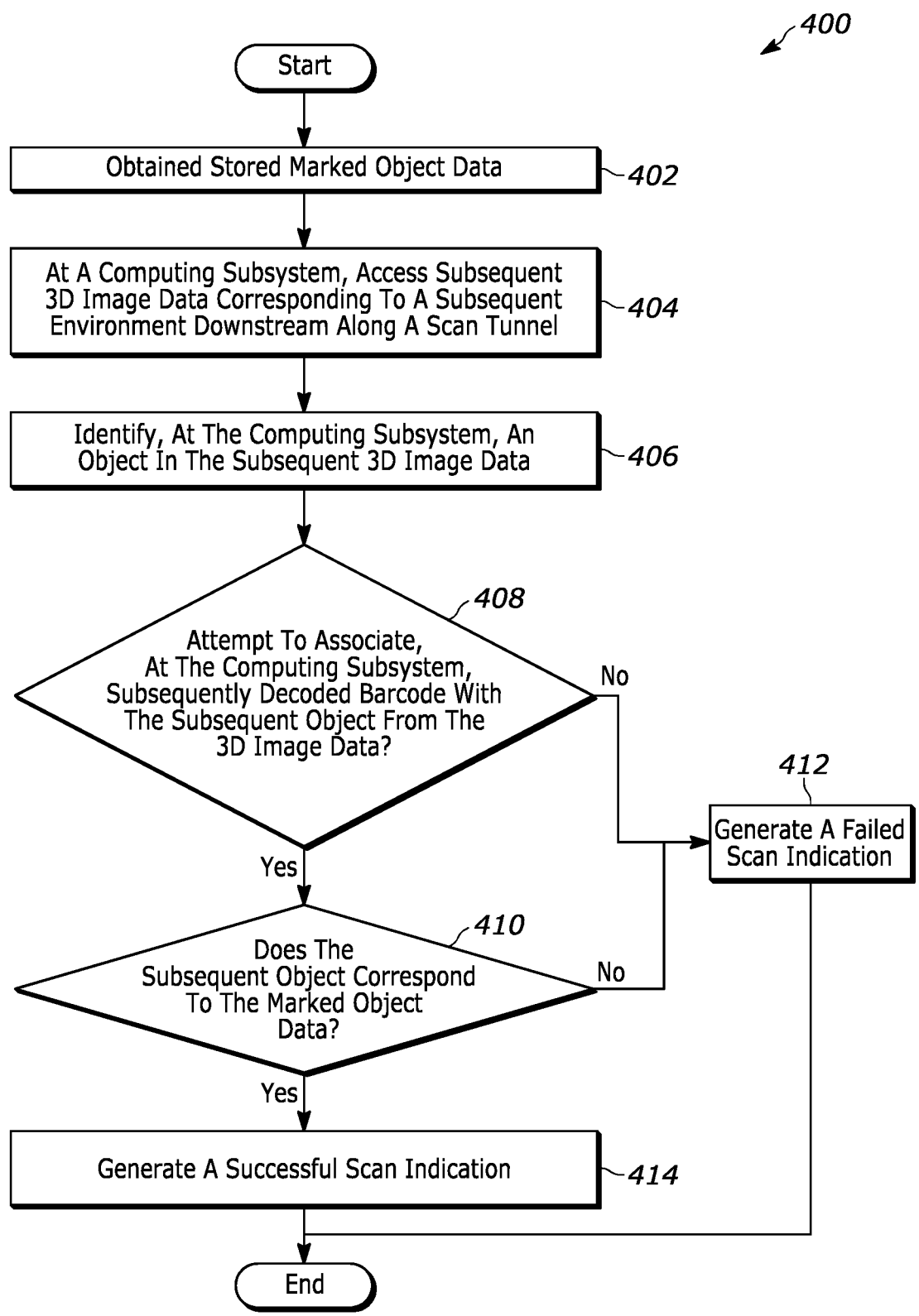
FIG. 5 is a flowchart representative of a method for object tracking to identify a successful and unsuccessful tracking of an object over a scan tunnel, in accordance with embodiments described herein.

In some examples, the object tracking application 244a tracks an object over a scan tunnel to determine if the object properly exits the scan tunnel. FIGS. 4A and 4B illustrate an environment 450, similar to that of environment 100 in FIG. 1, but where the target object 108 as moved to a subsequent environment at the exit point 116 and has been successfully tracked (FIG. 4A) and where the target 108 of FIG. 1 has not been successfully tracked (FIG. 4B), resulting in failed tracking event. FIG. 5 illustrates a flowchart of an example method 400 that may be performed by the object tracking application 224a to identify a successful and unsuccessful tracking of the object over a scan tunnel. At a block 402, a computing subsystem obtains marked object data (e.g., correspond to the target object 108), generated by the process 300 of FIG. 3A. At a block 404, subsequent captured 3D image data corresponding to subsequent environment along a scan tunnel is accessed. For example, the 3D image data may have been captured by the machine vision camera 102d over an environment around the exit point 116, which is downstream of the entry point 110. Of course, the 3D image data may be captured from any machine vision camera 102b-102d downstream of the initial machine vision camera 102a. In some examples, subsequent 3D image data may be captured from the same imaging device that captured the 3D image data resulting in the marked object data obtained at block 402.

To trigger determination of a successful or unsuccessful tracking attempt, at a block 406, the method 400 identifies an object in the sequent 3D image data. In some examples, the block 404 may capture 3D image data over a window of time and for each of captured 3D image data the block 406 attempts to identify an object in the corresponding 3D image data. If after a predetermined scan window time, the block 406 fails to identify an object, then a fault condition is determined (not shown) and a fault signal is sent to an operator and/or fault signal data is stored at the computing subsystem. Assuming, that an object is identified in subsequent 3D image data, at a block 408, the method 400 attempts to mark the corresponding object data with a barcode. In particular, the method 400 attempts to associate a subsequently decoded barcode (i.e., a 2D image of a subsequently decoded barcode) obtained from 2D image data captured over the same environment as that of the 3D image data (e.g., from 2D image data captured by the imaging device 104d). If the block 408 is unsuccessful in associating a subsequent barcode with the object from block 406, then a failed scan indication is generated for a user and/or stored at the computing subsystem. Instead, if the block 408 successfully associates a subsequent barcode with the subsequent 3D image data, then control is passed to a block 410. An unsuccessful attempt at block 408 may occur in various ways. If none of the imaging devices (e.g., devices 104a-104d) capture a subsequent 2D image data of the subsequent environment, then the attempt at block 408 fails. If one or more 2D image data are captured by one or more of the imaging devices (e.g., devices 104a-104d) and the block 408 fails to identify a barcode in any of those devices, then the attempt at block 408 fails. FIG. 4B illustrates an example environment 450 in which 3D image data of an object 452 has been captured by machine vision camera 102d, but imaging device 104d (or devices 104c or 104b) fails to capture any 2D image data containing a barcode.

At a block 410, the subsequent object and associated barcode from block 408 are compared to the marked object data to determine if the subsequent object is the same as the initially scanned object used to generate the marked object data. In some examples, at the block 410, the method 400 performs a comparison of 3D image data, e.g., point cloud data, and barcode data, e.g., decoded barcode payload data, to determine if a match exists. If either the point cloud data or the barcode data from the marked object data does not match that of the associated subsequent object and subsequent barcode (also termed a subsequent marked object data) (e.g., as illustrated in FIG. 4B), then the block 410 determines there is not a match at a failed scan indication is generated at the block 412. Such scenarios may happen when an object has been damaged or rotated or where a barcode has fallen off or been damaged or the object is otherwise affected. In such situations, the object should be provided for specific handling and not passed on the next stage after the conveyor belt. In some examples (not shown) objects that fail at block 410 may be indicated with a laser spot or laser symbol. That is, the block 412 may send an instruction signal to an external laser device to provide a visual indication onto the object resulting in the failed scan. In some examples, the block 412 may send a signal to a conveyor belt offloader that removes the object from the conveyor belt after passing the exit point. In any event, if the subsequent object matches the marked object data (e.g., as illustrated in FIG. 4A), then a block 414 indicates a successful scan indication to a user.

In various examples, the object tracking application 224a includes a 4D projection application 224b that uses projection data 224c to track on object over a scan tunnel for determining a successful passing of the object over the scan tunnel. In particular, the 4D projection application is designed to receive marked object data and perform a 4D projection of that marked object data, where that 4D projection represents an expected future location of the object in the scan tunnel, based on an expected movement of the object via the conveyor belt.

Figure 6:
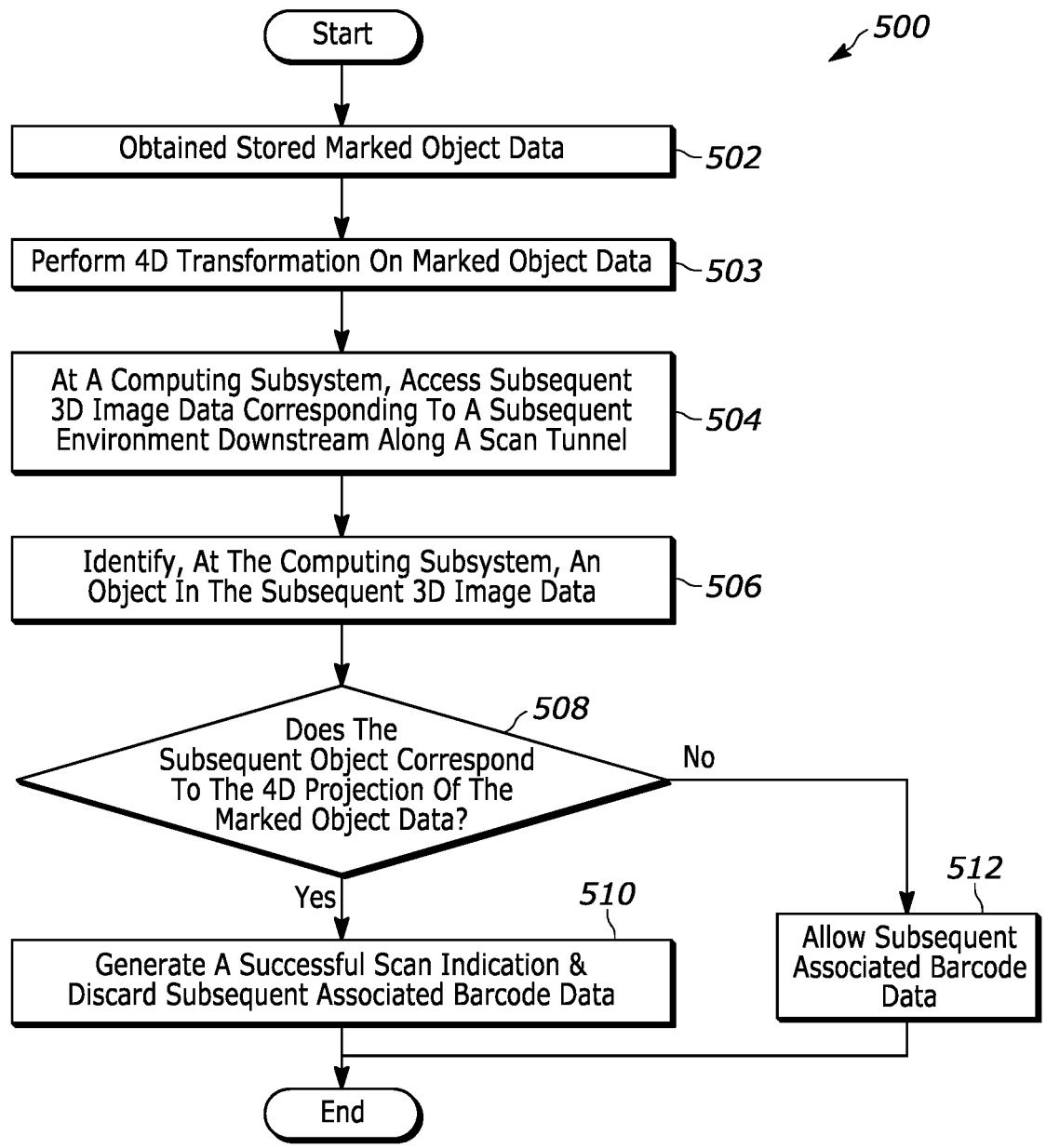
FIG. 6 is a flowchart representative of a method for tracking an object over a scan tunnel using a 4D projection, in accordance with embodiments described herein.
Figure 7:
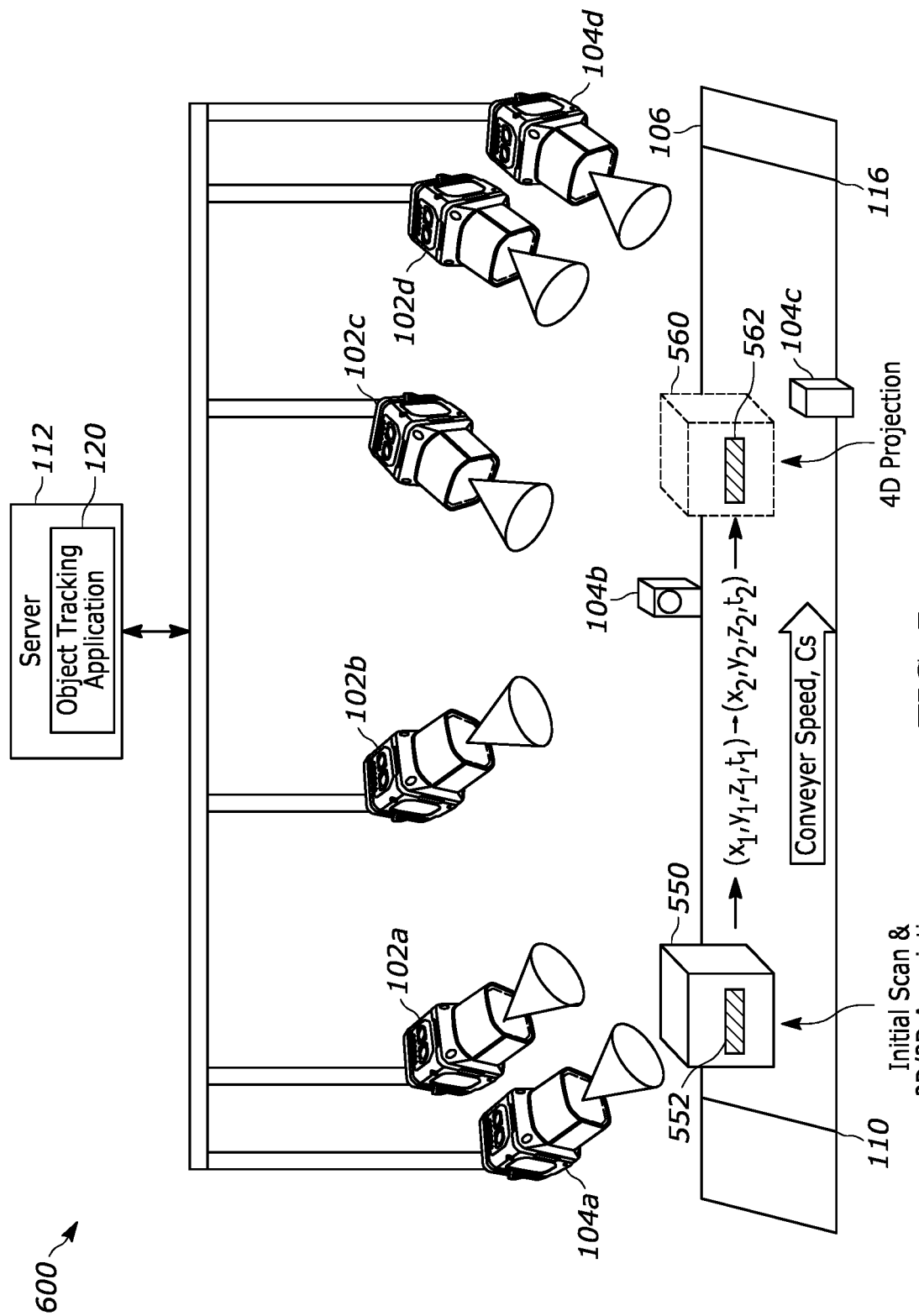
FIG. 7 depicts an example environment in which systems/devices for tracking a barcode may be implemented and showing a 4D projection of an object, in accordance with embodiments described herein.

FIG. 6 illustrates a flowchart of a method 500 for tracking an object over a scan tunnel using a 4D projection. At a block 502, a computing subsystem obtains previously stored marked object data (e.g., corresponding to the target 550 and associated barcode 552 in the environment 600 of FIG. 7). At a block 503, a 4D projection is performed on the marked object data using obtained, sensed, and/or stored projection data of various types. The 4D transformation transforms the marked object data in 3D location at a time, $t_1$, to a downstream 3D location, at a time, $t_2$ (($x_1$, $y_1$, $z_1$, $t_1$)→($x_2$, $y_2$, $z_2$, $t_2$)), resulting in a projected marked object data 560 (with associated projected barcode 562). To affect the projection, the block 503 may object various types of projection data (e.g., 224c), including the position in 3D space and orientation of each of the imaging devices (3D imaging devices and 2D imaging devices) to account for their relative position to one another, relative to the scan tunnel, and relative to the conveyor belt (e.g., the conveyor belt 106). The projection data may include the speed, $C_s$, of the conveyor belt.

At a block 504, subsequent captured 3D image data corresponding to subsequent environment along a scan tunnel is accessed. For example, the 3D image data may have been captured by the machine vision camera 102d over an environment around the exit point 116, which is downstream of the entry point 110. The 3D image data may be captured from any machine vision camera 102b-102d downstream of the initial machine vision camera 102a. In some examples, subsequent 3D image data may be captured from the same imaging device that captured the 3D image data resulting in the marked object data obtained at block 502.

At a block 506, the method 500 identifies an object in the sequent 3D image data. Similar to the blocks 404 and 406, in some examples, the block 504 may capture 3D image data over a window of time and for each of captured 3D image data and the block 506 attempts to identify an object in the corresponding 3D image data. If after a predetermined scan window time, the block 506 fails to identify an object, then a fault condition is determined (not shown) and a fault signal is sent to an operator and/or fault signal data is stored at the computing subsystem.

Figure 8:
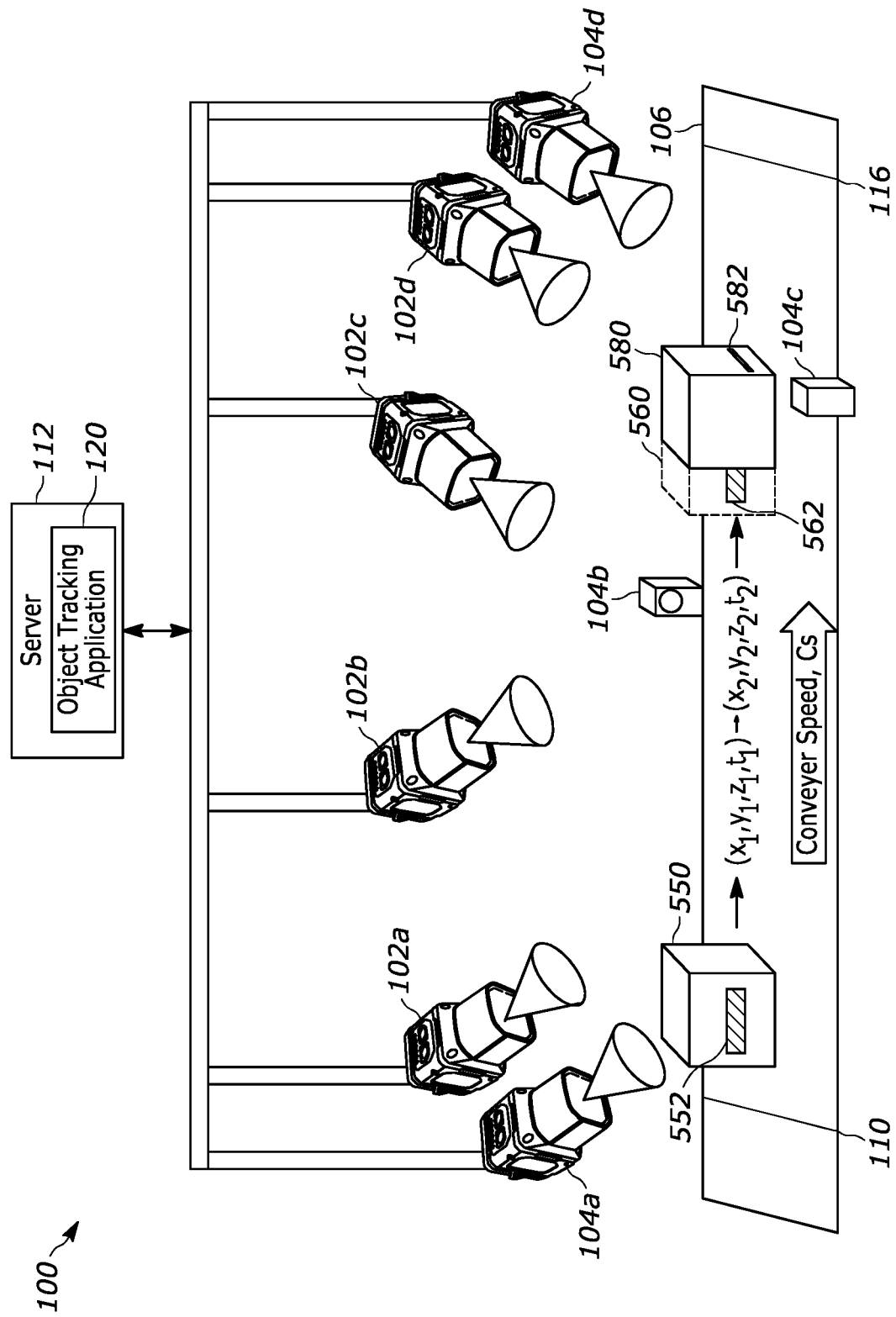
FIG. 8 depicts an example environment in which systems/devices for tracking a barcode may be implemented and showing a successful tracking of an object using a 4D projection, in accordance with embodiments described herein.
Figure 9:
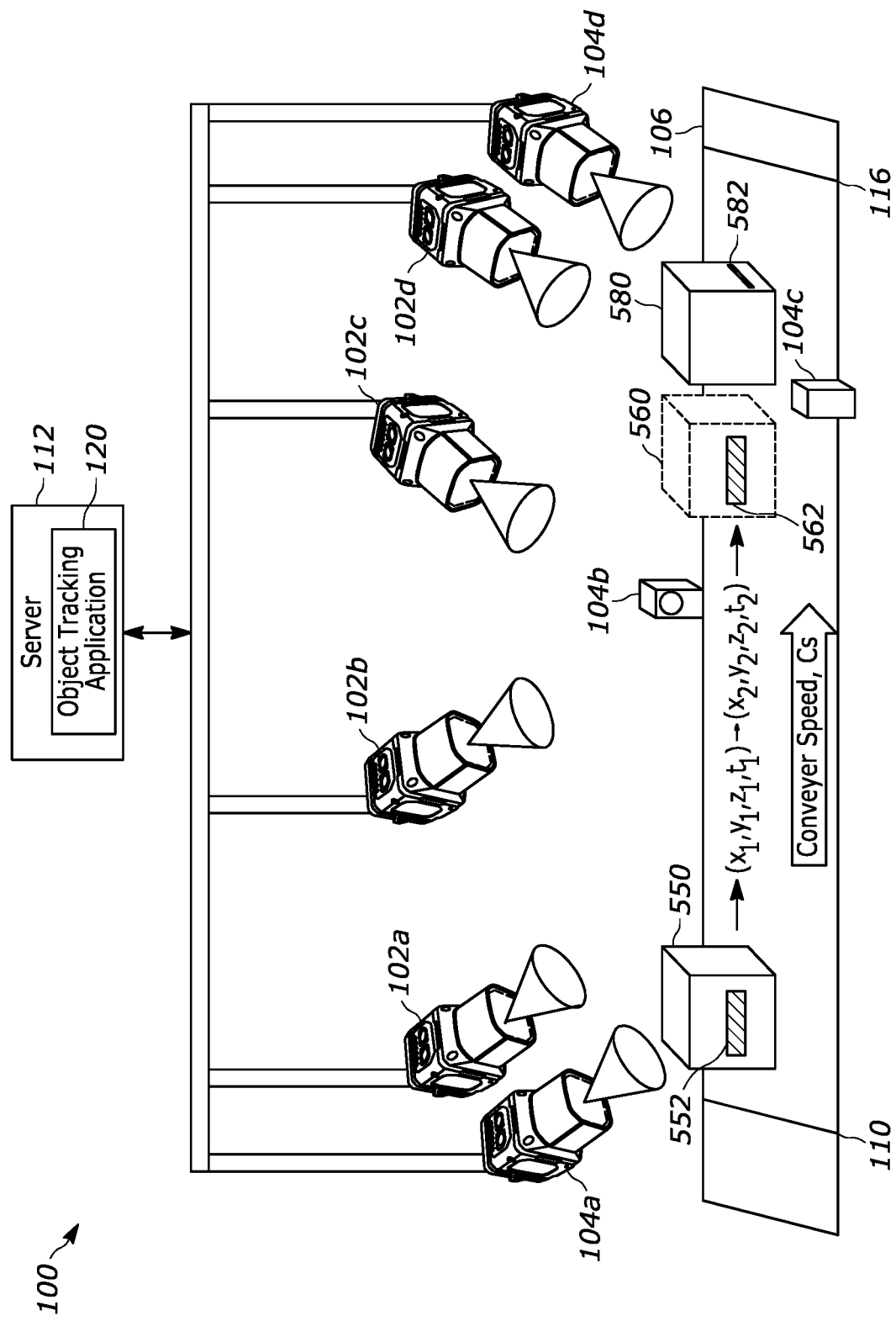
FIG. 9 depicts an example environment in which systems/devices for tracking a barcode may be implemented and showing an unsuccessful tracking of an object using a 4D projection, in accordance with embodiments described herein.

Assuming, that an object is identified in subsequent 3D image data, at a block 508, the method 500 attempts to analyze the object data to determine if the object data corresponds to a 4D projection of the marked object data projected at the block 503. An example is shown in FIG. 8. At the block 504, 3D image data is obtained from the machine vision camera 102d, and an object 580 in that 3D image data is identify at the block 506. In particular, the block 506 identifies object data in a 3D space within which projections are made. The block 508 then compares the object data defining the 3D position of the object 580 to the 3D position of the projected marked object 560. If the 3D position of the object 580 substantially overlaps with the 3D position of the projection 560, then the block 508 determines that the object is the same as the initial object 550. The block 508 may be configured to set a predetermined amount overlap of substantial overlap as to at least 50% overlap, at least 60% overlap, at least 70% overlap, at least 80% overlap, or at least 90% overlap. If the block 508 determines that there is substantial overlap (see, e.g., FIG. 8) and therefore that the object 580 is the same as the object 550, then at a block 510, the method 500 may generate a successful scan indication. Also, however, to prevent the object from being barcode scanned twice and counted as two different objects, the block 510 discards any associated barcode data obtained from any subsequently captured 2D images. That is, upon successful identification at the block 508, the block 510 will discard any decoding of a barcode 582 captured in 2D image data. Notably, in some examples, including as illustrated, that discarding occurs regardless of whether the barcode 582 is or would be associated with the object data along the same plane as in the original marked object data 550/552.

In some examples, to determine correspondence, the block 508 uses both object data from subsequent 3D image data and barcode data from subsequent 2D image data. For example, in some examples, at the block 508, subsequent 2D image data is analyzed at the computing subsystem to identify and decode a subsequent barcode identified in that 2D image data. The block 508 may then perform an association of that barcode with the object data from the block 506 and generate a subsequent marked object data (e.g., an association of the object 580 and the barcode 582 in FIG. 8). At the block 508, the method 500 then compares the subsequent marked object data to the projected marked object data to determine if there is a match. In such examples, the position of the associated barcode may therefore be taken into account. In some examples, if the barcode in the subsequent marked object data is in a different position or different orientation than that expected of the barcode based in the projected marked object data, then the block 508 may determine there is no match (e.g., the object 580 does not satisfy the projected object 560).

In response to there not being a match at a block 508 (see, e.g., FIG. 9), control is passed to a block 512, which can be configured in various different ways. In the illustrated example, at the block 512, the method 500 allows subsequent barcode associated with the object to be stored and/or indicated as a successful scan event—the subsequently identified object and associated barcode are different that the initial object and barcode. In some examples (not shown), the block 512 may be configured to reject the subsequent (e.g., object 580) and generate a failed scan indication.

It is to be appreciated that the actions of the methods 300, 400, and 500 may be performed in any suitable order and any suitable number of times in order to change the program(s) executing on any of the 2D imaging device, the 3D imaging device, and/or any other suitable device described herein or combinations thereof.

ADDITIONAL CONSIDERATIONS

The above description refers to a block diagram of the accompanying drawings. Alternative implementations of the example represented by the block diagram includes one or more additional or alternative elements, processes and/or devices. Additionally, or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A system for tracking barcodes in space, the system comprising:
   a three-dimensional (3D) data acquisition subsystem;
   a two-dimensional (2D) imaging subsystem comprising one or more 2D imagers and one or more decode processors, wherein the 2D imaging subsystem is oriented and configured to:
      at the one or more 2D imagers, capture a 2D image data representing a 2D image of an environment of a scan tunnel; and
      at the one or more decode processors, decode a barcode identified in the captured 2D image data; and
   a computing subsystem including one or more processors, and a non-transitory computer-readable storage medium storing instructions that, when executed by the one or more processors, cause the computing system to:
      access, from the 3D data acquisition subsystem, captured 3D image data corresponding to a 3D representation of the environment;
      identify in the environment an object, based on the captured 3D image data, and associate the object with the barcode identified in the captured 2D image data to generate marked object data representing the object in the environment; and
      perform a four-dimensional (4D) projection of the marked object data in the scan tunnel, the projection representing an expected future location of the object in the scan tunnel based on an expected or measured movement of the object.

2. The system of claim 1, wherein the non-transitory computer-readable storage medium stores instructions that, when executed by the one or more processors, cause the computing system to:
   access, from the 3D data acquisition subsystem, subsequent captured 3D image data corresponding to a subsequent 3D representation of a subsequent environment of the scan tunnel downstream of the first environment;
   identify in the subsequent environment an object from the subsequent captured 3D image data;
   in response to successfully associating a decoded barcode corresponding to the subsequent environment with the object in the second environment, generating a successful scan indication; and
   in response to not successfully associating a decoded barcode with the object in the subsequent environment, generating a failed scan indication.

3. The system of claim 2, wherein the non-transitory computer-readable storage medium stores instructions that, when executed by the one or more processors, cause the computing system to:
   at the one or more 2D imagers, capture a subsequent 2D image data representing a 2D image of a subsequent environment; and
   at the one or more decode processors, attempt to identify a barcode in the subsequent 2D image data and, in response, decode the identified barcode identified in the subsequent 2D image data.

4. The system of claim 2, wherein the non-transitory computer-readable storage medium stores instructions that, when executed by the one or more processors, cause the computing system to:
   generate the failed scan indication in response to,
      at the one or more 2D imagers, unsuccessfully capturing a subsequent 2D image data representing a 2D image of the subsequent environment, or
      at the one or more 2D imagers, capturing the subsequent 2D image data representing the 2D image of the subsequent environment and unsuccessfully identifying a barcode in the subsequent 2D image data.

5. The system of claim 1, further comprising:
   at the one or more 2D imagers, capture a subsequent 2D image data representing a 2D image of a subsequent environment of the scan tunnel downstream of the environment;
   at the one or more decode processors, decode a subsequent barcode identified in the subsequent 2D image data; and
   wherein the instructions, when executed by the one or more processors, cause the computing system to:
      access, from the 3D data acquisition subsystem, subsequent captured 3D image data corresponding to a subsequent 3D representation of the subsequent environment;
      identify in the subsequent environment a subsequent object from the subsequent captured 3D image data;
      associate the subsequent object with the subsequent barcode to generate subsequent marked object data representing the subsequent object;
      determine whether the subsequent marked object data satisfies the 4D projection of the marked object data space; and
      when the subsequent marked object data satisfies the 4D projection of the marked object data, determine that the decoding of the subsequent barcode is a duplicate decoding of the barcode.

6. The system of claim 5, wherein the instructions, when executed by the one or more processors, cause the computing subsystem to determine whether the subsequent marked object data satisfies the 4D projection of the marked object data space by:
   determining whether the subsequent marked object data at least partially overlaps with the 4D projection of the marked object data space in the subsequent environment; and
   if the subsequent marked object data at least partially overlaps with the 4D projection of the marked object data space in the subsequent environment, determining that the subsequent marked object data satisfies the 4D projection of the marked object data space.

7. The system of claim 6, wherein the instructions, when executed by the one or more processors, cause the computing subsystem to determine whether the subsequent marked object data satisfies the 4D projection of the marked object data space by:
   if the subsequent marked object data does not at least partially overlap with the 4D projection of the marked object data space in the subsequent environment, determining that the subsequent marked object data does not satisfy the 4D projection of the marked object data space and determining that the subsequent object is different than the object.

8. The system of claim 1, wherein the system further comprises a moving surface configured to move across the scan tunnel, and wherein the instructions, when executed by the one or more processors, cause the computing subsystem to perform the 4D projection of the marked object data in the scan tunnel, based on the expected movement of the moving surface upon which the object is to reside.

9. The system of claim 8, wherein the moving surface is a conveyor belt moving substantially linearly through the environment.

10. The system of claim 1, wherein the instructions, when executed by the one or more processors, cause the computing subsystem to associate the object with the barcode by identifying the location and the orientation of the barcode relative to the object based on a position and an orientation of the one or more 2D imagers.

11. The system of claim 1, wherein the instructions, when executed by the one or more processors, cause the computing subsystem to associate the object with the barcode by accessing the captured 3D image data captured at a capture time associated with a captured time of the 2D image data.

12. The system of claim 1, wherein the 3D data acquisition subsystem comprises a 3D camera, a time-of-flight 3D camera, a structured light 3D camera, or a machine learning model that processes one or more 2D images to create the 3D image data.

13. The system of claim 1, wherein the computing subsystem is communicatively coupled to the one or more barcode scanner subsystems and/or to the 3D data acquisition subsystem through a communication network.

14. A method for tracking barcodes in space, the method comprising:
capturing, at the one or more two-dimensional (2D) imagers, 2D image data representing a 2D image of an environment of a scan tunnel;
decoding, at one or more decode processors, a barcode identified in the captured 2D image data;
accessing, from a three-dimensional (3D) data acquisition subsystem, captured 3D image data corresponding to a 3D representation of the environment;
identifying in the environment an object, based on the captured 3D image data, and associating the object with the barcode identified in the captured 2D image data to generate a marked object data representing the object in the environment; and
performing a four-dimensional (4D) projection of the marked object data in the scan tunnel, the projection representing an expected future location of the object in the scan tunnel based on an expected or measured movement of the object.

15. The method of claim 14, further comprising:
accessing, from the 3D data acquisition subsystem, subsequent captured 3D image data corresponding to a subsequent 3D representation of a subsequent environment of the scan tunnel downstream of the first environment;
identifying in the subsequent environment an object from the subsequent captured 3D image data;
in response to successfully associating a subsequently decoded barcode corresponding to the subsequent environment with the object in the second environment, generating a successful scan indication; and
in response to not successfully associating a subsequently decoded barcode with the object in the second subsequent environment, generating a failed scan indication.

16. The method of claim 15, further comprising:
at the one or more 2D imagers, capturing a subsequent 2D image data representing a 2D image of a subsequent environment; and
at the one or more decode processors, attempting to identify a barcode in the subsequent 2D image data and, in response, decoding the identified barcode identified in the subsequent 2D image data.

17. The method of claim 15, further comprising:
generating the failed scan indication in response to,
at the one or more 2D imagers, unsuccessfully capturing a subsequent 2D image data representing a 2D image of the subsequent environment, or
at the one or more 2D imagers, capturing the subsequent 2D image data representing the 2D image of the subsequent environment and unsuccessfully identifying a barcode in the subsequent 2D image data.

18. The method of claim 14, further comprising:
at the one or more 2D imagers, capturing a subsequent 2D image data representing a 2D image of a subsequent environment of the scan tunnel downstream of the environment;
at the one or more decode processors, decoding a subsequent barcode identified in the subsequent 2D image data;
accessing, from the 3D data acquisition subsystem, subsequent captured 3D image data corresponding to a subsequent 3D representation of the subsequent environment;
identifying in the subsequent environment a subsequent object from the subsequent captured 3D image data;
associating the subsequent object with the subsequent barcode to generate subsequent marked object data representing the subsequent object;
determining whether the subsequent marked object data satisfies the 4D projection of the marked object data space; and
when the subsequent marked object data satisfies the 4D projection of the marked object data, determining that the decoding of the subsequent barcode is a duplicate decoding of the barcode.

19. The method of claim 18, wherein determining whether the subsequent marked object data satisfies the 4D projection of the marked object data space by:
determining whether the subsequent marked object data at least partially overlaps with the 4D projection of the marked object data space in the subsequent environment; and
if the subsequent marked object data at least partially overlaps with the 4D projection of the marked object data space in the subsequent environment, determining that the subsequent marked object data satisfies the 4D projection of the marked object data space.

20. The method of claim 19, wherein determining whether the subsequent marked object data satisfies the 4D projection of the marked object data space by:
if the subsequent marked object data does not at least partially overlap with the 4D projection of the marked object data space in the subsequent environment, determining that the subsequent marked object data does not satisfy the 4D projection of the marked object data space and determining that the subsequent object is different than the object.

21. The method of claim 14, further comprising performing the 4D projection of the marked object data in the scan tunnel, based on the expected movement of a moving surface upon which the object is to reside.

22. The method of claim 14, further comprising associating the object with the barcode by identifying the location and the orientation of the barcode relative to the object based on a position and an orientation of the one or more 2D imagers.

23. The method of claim 14, further comprising associating the object with the barcode by accessing the captured 3D image data captured at a capture time associated with a captured time of the 2D image data.

24. The method of claim 14, wherein the 3D data acquisition subsystem comprises a 3D camera, a time-of-flight 3D camera, a structured light 3D camera, or a machine learning model that processes one or more 2D images to create the 3D image data.

* * * * *